US010110590B2

(12) United States Patent
Alphin, III et al.

(10) Patent No.: US 10,110,590 B2
(45) Date of Patent: *Oct. 23, 2018

(54) LIVE TILES WITHOUT APPLICATION-CODE EXECUTION

(71) Applicant: Microsoft Technology Licensing, LLC, Redmond, WA (US)

(72) Inventors: Thomas H. Alphin, III, Kirkland, WA (US); John Michael Calandrino, Bothell, WA (US); Benjamin Salim Srour, Seattle, WA (US); Richard J. Duncan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,225

(22) Filed: Aug. 25, 2017

(65) Prior Publication Data

US 2018/0026965 A1 Jan. 25, 2018

Related U.S. Application Data

(63) Continuation of application No. 15/235,359, filed on Aug. 12, 2016, now Pat. No. 9,807,081, which is a continuation of application No. 13/904,880, filed on May 29, 2013, now Pat. No. 9,450,952.

(51) Int. Cl.
*H04L 29/06* (2006.01)
*G06F 17/30* (2006.01)
*G06F 3/0482* (2013.01)
*G06F 17/22* (2006.01)
(Continued)

(52) U.S. Cl.
CPC ........ *H04L 63/0815* (2013.01); *G06F 3/0482* (2013.01); *G06F 9/451* (2018.02); *G06F 17/2247* (2013.01); *G06F 17/30386* (2013.01); *H04L 63/083* (2013.01); *H04L 63/102* (2013.01); *G06F 8/61* (2013.01)

(58) Field of Classification Search
CPC . G06F 3/0484; G06F 8/34; G06F 8/38; G06F 9/443; H04N 5/44543
See application file for complete search history.

(56) References Cited

U.S. PATENT DOCUMENTS

| 4,823,283 A | 4/1989 | Diehm et al. |
| 5,045,997 A | 9/1991 | Watanabe |
| 5,046,001 A | 9/1991 | Barker et al. |

(Continued)

FOREIGN PATENT DOCUMENTS

| CN | 101944034 A | 1/2011 |
| CN | 102197702 | 9/2011 |

(Continued)

OTHER PUBLICATIONS

"Office Action Issued in European Patent Application No. 13773999.1", dated Jan. 30, 2018, 4 Pages.

(Continued)

*Primary Examiner* — Antonio A Caschera
(74) *Attorney, Agent, or Firm* — Newport IP, LLC; Jacob P. Rohwer

(57) ABSTRACT

Techniques enabling live tiles without application-code execution permit live content to be presented in tiles without executing code of applications associated with those tiles. By so doing, live tiles may be presented more safely, faster, or using fewer resources.

20 Claims, 8 Drawing Sheets

(51) Int. Cl.
*G06F 9/451* (2018.01)
*G06F 8/61* (2018.01)

(56) References Cited

U.S. PATENT DOCUMENTS

| | | |
|---|---|---|
| 5,189,732 A | 2/1993 | Kondo |
| 5,258,748 A | 11/1993 | Jones |
| 5,297,032 A | 3/1994 | Trojan et al. |
| 5,321,750 A | 6/1994 | Nadan |
| 5,339,392 A | 8/1994 | Risberg et al. |
| 5,432,932 A | 7/1995 | Chen et al. |
| 5,463,725 A | 10/1995 | Henckel et al. |
| 5,485,197 A | 1/1996 | Hoarty |
| 5,495,566 A | 2/1996 | Kwatinetz |
| 5,515,495 A | 5/1996 | Ikemoto |
| 5,574,836 A | 11/1996 | Broemmelsiek |
| 5,598,523 A | 1/1997 | Fujita |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,675,329 A | 10/1997 | Barker |
| 5,687,331 A | 11/1997 | Volk et al. |
| 5,712,995 A | 1/1998 | Cohn |
| 5,771,042 A | 6/1998 | Santos-Gomez |
| 5,793,415 A | 8/1998 | Gregory et al. |
| 5,819,284 A | 10/1998 | Farber et al. |
| 5,860,073 A | 1/1999 | Ferrel et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,311,058 B1 | 10/2001 | Wecker et al. |
| 6,369,837 B1 | 4/2002 | Schirmer |
| 6,385,630 B1 | 5/2002 | Ejerhed |
| 6,396,963 B2 | 5/2002 | Shaffer |
| 6,411,307 B1 | 6/2002 | Rosin et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,597 B1 | 5/2003 | Seki et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,662,023 B1 | 12/2003 | Helle |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,724,403 B1 | 4/2004 | Santoro et al. |
| 6,784,925 B1 | 8/2004 | Tomat et al. |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,938,101 B2 | 8/2005 | Hayes et al. |
| 6,961,731 B2 | 11/2005 | Holbrook |
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera Y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,262,775 B2 | 8/2007 | Calkins et al. |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs et al. |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,512,966 B2 | 3/2009 | Lyons, Jr. et al. |

(56) References Cited

U.S. PATENT DOCUMENTS

| | | |
|---|---|---|
| 7,577,918 B2 | 8/2009 | Lindsay |
| 7,581,034 B2 | 8/2009 | Polivy et al. |
| 7,593,995 B1 | 9/2009 | He et al. |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,702,683 B1 | 4/2010 | Kirshenbaum |
| 7,755,674 B2 | 7/2010 | Kaminaga |
| 7,834,861 B2 | 11/2010 | Lee |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,933,632 B2 | 4/2011 | Flynt et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,065,628 B2 | 11/2011 | Oshiro et al. |
| 8,086,275 B2 | 12/2011 | Wykes |
| 8,108,781 B2 | 1/2012 | Laansoo et al. |
| 8,131,808 B2 | 3/2012 | Aoki et al. |
| 8,150,924 B2 | 4/2012 | Buchheit et al. |
| 8,175,653 B2 | 5/2012 | Smuga |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 | 8/2012 | Parparita et al. |
| 8,269,736 B2 | 9/2012 | Wilairat |
| 8,560,959 B2 | 10/2013 | Zaman et al. |
| 8,612,874 B2 | 12/2013 | Zaman et al. |
| 8,689,123 B2 | 4/2014 | Zaman et al. |
| 9,015,606 B2 | 4/2015 | Zaman et al. |
| 9,213,468 B2 | 12/2015 | Zaman et al. |
| 9,229,918 B2 | 1/2016 | Zaman et al. |
| 9,450,952 B2 | 9/2016 | Alphin et al. |
| 9,766,790 B2 | 9/2017 | Zaman et al. |
| 9,807,081 B2 | 10/2017 | Alphin et al. |
| 9,864,494 B2 | 1/2018 | Zaman et al. |
| 9,870,132 B2 | 1/2018 | Zaman et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0237048 A1 | 11/2004 | Tojo et al. |
| 2004/0250217 A1 | 12/2004 | Tojo et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0143138 A1 | 6/2005 | Lee et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0216300 A1 | 9/2005 | Appelman et al. |
| 2005/0223057 A1 | 10/2005 | Buchheit et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0059430 A1 | 3/2006 | Bells |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0103623 A1 | 5/2006 | Davis |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |

(56) References Cited

U.S. PATENT DOCUMENTS

| | | |
|---|---|---|
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083821 A1 | 4/2007 | Garbow et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0157089 A1 | 7/2007 | Van Os et al. |
| 2007/0171192 A1 | 7/2007 | Seo et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0028294 A1 | 1/2008 | Sell et al. |
| 2008/0032681 A1 | 2/2008 | West |
| 2008/0036743 A1 | 2/2008 | Westerman et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189658 A1 | 8/2008 | Jeong et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242362 A1 | 10/2008 | Duarte |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0309626 A1 | 12/2008 | Westerman et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dukhon |
| 2009/0085851 A1 | 4/2009 | Lim |
| 2009/0085878 A1 | 4/2009 | Heubel et al. |
| 2009/0089215 A1 | 4/2009 | Newton |
| 2009/0094562 A1 | 4/2009 | Jeong et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0182788 A1 | 7/2009 | Chung et al. |
| 2009/0184939 A1 | 7/2009 | Wohlstadter et al. |
| 2009/0199122 A1 | 8/2009 | Deutsch et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |

(56) References Cited

U.S. PATENT DOCUMENTS

| | | |
|---|---|---|
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0307682 A1 | 12/2009 | Gharabally et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0318171 A1 | 12/2009 | Backholm et al. |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0066698 A1 | 3/2010 | Seo |
| 2010/0070931 A1 | 3/2010 | Nichols |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079413 A1 | 4/2010 | Kawashima et al. |
| 2010/0081475 A1 | 4/2010 | Chiang et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman et al. |
| 2010/0105440 A1 | 4/2010 | Kruzeniski |
| 2010/0105441 A1 | 4/2010 | Voss |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0131901 A1 | 5/2010 | Takahashi et al. |
| 2010/0138767 A1 | 6/2010 | Wang et al. |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029904 A1 | 2/2011 | Smith et al. |
| 2011/0029934 A1 | 2/2011 | Locker et al. |
| 2011/0043527 A1 | 2/2011 | Ording et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0154235 A1 | 6/2011 | Min et al. |
| 2011/0161845 A1 | 6/2011 | Stallings et al. |
| 2011/0163968 A1 | 7/2011 | Hogan |
| 2011/0173556 A1 | 7/2011 | Czerwinski et al. |
| 2011/0175930 A1 | 7/2011 | Hwang et al. |
| 2011/0225547 A1 | 9/2011 | Fong et al. |
| 2011/0231796 A1 | 9/2011 | Vigil |
| 2011/0252380 A1 | 10/2011 | Chaudhri |
| 2012/0028687 A1 | 2/2012 | Wykes |
| 2012/0050185 A1 | 3/2012 | Davydov et al. |
| 2012/0078720 A1 | 3/2012 | Pappas et al. |
| 2012/0151397 A1 | 6/2012 | Oberstein et al. |
| 2012/0159395 A1 | 6/2012 | Deutsch et al. |
| 2012/0162266 A1 | 6/2012 | Douglas et al. |
| 2012/0167008 A1 | 6/2012 | Zaman |
| 2012/0167011 A1 | 6/2012 | Zaman |
| 2012/0174005 A1 | 7/2012 | Deutsch et al. |
| 2012/0174029 A1 | 7/2012 | Bastide et al. |
| 2012/0174034 A1 | 7/2012 | Chae et al. |
| 2012/0179992 A1 | 7/2012 | Smuga |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0233571 A1 | 9/2012 | Wever et al. |
| 2012/0244841 A1 | 9/2012 | Teng |
| 2012/0254780 A1 | 10/2012 | Mouton et al. |
| 2012/0265644 A1 | 10/2012 | Roa et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2013/0033525 A1 | 2/2013 | Markiewicz et al. |
| 2013/0042203 A1 | 2/2013 | Wong et al. |
| 2013/0042206 A1 | 2/2013 | Zaman et al. |
| 2014/0082552 A1 | 3/2014 | Zaman |
| 2014/0109008 A1 | 4/2014 | Zaman |
| 2014/0359721 A1 | 12/2014 | Alphin et al. |
| 2015/0193403 A1 | 7/2015 | Zaman et al. |
| 2016/0041710 A1 | 2/2016 | Zaman et al. |
| 2016/0041711 A1 | 2/2016 | Zaman et al. |
| 2016/0041730 A1 | 2/2016 | Zaman et al. |
| 2016/0352724 A1 | 12/2016 | Alphin et al. |
| 2017/0315705 A1 | 11/2017 | Zaman et al. |

FOREIGN PATENT DOCUMENTS

| | | |
|---|---|---|
| EP | 0583060 | 2/1994 |
| EP | 1434411 | 6/2004 |

(56) References Cited

FOREIGN PATENT DOCUMENTS

| | | |
|---|---|---|
| EP | 1752868 | 2/2007 |
| JP | 2004227393 | 8/2004 |
| JP | 2004357257 | 12/2004 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 1020100056369 | 5/2010 |
| KR | 20110038632 | 4/2011 |
| TW | 201023026 | 6/2010 |
| WO | WO-9926127 | 5/1999 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010135155 | 11/2010 |
| WO | WO-2011041885 | 4/2011 |

OTHER PUBLICATIONS

"Adobe Acrobat 8 Standard User Guide", Adobe Systems Incorporated, 2007, pp. 34 & 36.
"Advisory Action", U.S. Appl. No. 12/414,382, dated Jan. 20, 2012, 3 pages.
"Advisory Action", U.S. Appl. No. 12/433,605, dated Apr. 5, 2012, 3 pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Android 2.3 User's Guide", AUG-2.3-103, Android mobile technology platform 2.3, Dec. 13, 2010, 380 pages.
"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.
"Application User Model IDs", Retrieved from: <http://msdn.microsoft.com/en-us/library/dd378459(VS.85).aspx> on Sep. 28, 2010, 2010, 6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.
"Basics of Your Device: Get Familiar with the Home Screen", Nokia USA—How to—retrieved from <http://www.nokia.ca/get-support-and-software/product-support/c6-01/how-to#> on May 11, 2011, 3 pages.
"Blackberry office tools: Qwerty Convert", Retrieved from: <http://blackberrysoftwarelist.net/blackberry/download-software/blackberry-office/qwerty_convert.aspx> on Nov. 20, 2008, Nov. 20, 2008, 1 page.
"Calc4M", Retrieved from: <http://www.hellebo.com/Calc4M.html> on Dec. 11, 2008, Sep. 10, 2008, 4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 2009, 5 Pages.
"Corrected Notice of Allowance", U.S. Appl. No. 14/089,149, dated Feb. 20, 2015, 2 pages.
"Corrected Notice of Allowance", U.S. Appl. No. 14/109,779, dated Jul. 21, 2015, 2 pages.
"Corrected Notice of Allowance", U.S. Appl. No. 14/109,779, dated Oct. 19, 2015, 2 pages.
"Corrected Notice of Allowance", U.S. Appl. No. 14/659,442, dated Nov. 10, 2015, 2 pages.
"Corrected Notice of Allowance", U.S. Appl. No. 14/659,442, dated Nov. 27, 2015, 2 pages.
"Corrected Notice of Allowance", U.S. Appl. No. 14/919,607, dated May 8, 2017, 2 pages.
"Corrected Notice of Allowance", U.S. Appl. No. 14/919,607, dated May 30, 2017, 2 pages.
"Corrected Notice of Allowance", U.S. Appl. No. 14/919,607, dated Aug. 21, 2017, 2 pages.
"Corrected Notice of Allowance", U.S. Appl. No. 15/235,359, dated Sep. 25, 2017, 5 pages.
"Dial a number", Retrieved from: <http://www.phonespell.org/ialhelp.html> on Nov. 20, 2008, Nov. 20, 2008, 1 page.
"DuoSense™ Multi-Touch Gestures", Retrieved from: <http://www.n-trig.com/Data/Uploads/Misc/DuoSenseMTG_final.pdf>, Jul. 2008, 4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.
"Email Notification for Microsoft Outlook and Outlook Express", Retrieved from: <http://www.contextmagic.com/express-notification/> on Sep. 29, 2010, Jul. 21, 2004, 3 pages.
"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>, Apr. 8, 2008, pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.
"Extended European Search Report", EP Application No. 09818253.8, Apr. 10, 2012, 7 pages.
"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>, Feb. 2006, 15 pages.
"Final Office Action", U.S. Appl. No. 11/305,789, dated Apr. 1, 2009, 10 pages.
"Final Office Action", U.S. Appl. No. 11/502,264, dated Feb. 4, 2010, 15 pages.
"Final Office Action", U.S. Appl. No. 11/502,264, dated Apr. 3, 2009, 9 pages.
"Final Office Action", U.S. Appl. No. 12/244,545, dated Dec. 7, 2011, 16 pages.
"Final Office Action", U.S. Appl. No. 12/244,545, dated Sep. 7, 2012, 23 pages.
"Final Office Action", U.S. Appl. No. 12/413,977, dated Nov. 17, 2011, 16 pages.
"Final Office Action", U.S. Appl. No. 12/414,382, dated Dec. 23, 2011, 7 pages.
"Final Office Action", U.S. Appl. No. 12/414,476, dated Dec. 1, 2011, 20 pages.
"Final Office Action", U.S. Appl. No. 12/433,605, dated Feb. 3, 2012, 11 pages.
"Final Office Action", U.S. Appl. No. 12/433,667, dated Sep. 13, 2011, 17 pages.

(56) References Cited

OTHER PUBLICATIONS

"Final Office Action", U.S. Appl. No. 12/469,458, dated Nov. 17, 2011, 15 pages.
"Final Office Action", U.S. Appl. No. 12/469,480, dated Feb. 9, 2012, 17 pages.
"Final Office Action", U.S. Appl. No. 12/484,799, dated Apr. 30, 2012, 13 pages.
"Final Office Action", U.S. Appl. No. 12/560,081, dated Mar. 14, 2012, 16 pages.
"Final Office Action", U.S. Appl. No. 13/904,880, dated Oct. 23, 2015, 24 pages.
"Final Office Action", U.S. Appl. No. 14/918,358, dated Apr. 27, 2017, 8 pages.
"Final Office Action", U.S. Appl. No. 14/918,359, dated May 17, 2017, 7 pages.
"Foreign Notice of Allowance", CN Application No. 201110437542.1, dated Aug. 3, 2015, 4 Pages.
"Foreign Notice of Allowance", CN Application No. 201110437572.2, dated Mar. 3, 2015, 3 Pages.
"Foreign Notice of Allowance", TW Application No. 105106514, dated Feb. 15, 2017, 4 pages.
"Foreign Office Action", CN Application No. 201110437542.1, dated Jan. 6, 2014, 10 Pages.
"Foreign Office Action", CN Application No. 201110437542.1, dated Jan. 28, 2015, 7 pages.
"Foreign Office Action", CN Application No. 201110437542.1, dated Aug. 20, 2014, 8 pages.
"Foreign Office Action", CN Application No. 201110437572.2, dated Dec. 3, 2013, 7 pages.
"Foreign Office Action", EP Application No. 11866579.3, dated Jul. 10, 2017, 4 pages.
"Freeware.mobi", Retrieved from: <http://www.palmfreeware.mobi/download-palette.html> on Nov. 6, 2008, Oct. 9, 2001, 2 pages.
"GnomeCanvas", Retrieved from: <http://library.gnome.org/devel/libgnomecanvas/unstable/GnomeCanvas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"HTC Shows HTC Snap with Snappy Email Feature", Retrieved from: <http://www.wirelessandmobilenews.com/smartphones/ on May 5, 2009>, May 4, 2009, 10 Pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"International Search Report and Written Opinion", Application No. PCT/US2010/028555, dated Oct. 12, 2010, 10 pages.
"International Search Report and Written Opinion", Application No. PCT/US2010/028699, dated Oct. 4, 2010, 10 pages.
"International Search Report and Written Opinion", Application No. PCT/US2011/067075, dated Dec. 12, 2012, 10 pages.
"International Search Report and Written Opinion", Application No. PCT/US2009/061864, dated May 14, 2010, 10 pages.
"International Search Report and Written Opinion", Application No. PCT/US2009/061382, dated May 26, 2010, 10 pages.
"International Search Report and Written Opinion", Application No. PCT/US2011/055725, dated Sep. 27, 2012, 10 pages.
"International Search Report and Written Opinion", Application No. PCT/US2009/061735, dated Jun. 7, 2010, 11 pages.
"International Search Report and Written Opinion", Application No. PCT/US2010/034772, dated Dec. 29, 2010, 12 pages.
"International Search Report and Written Opinion", Application No. PCT/US2013/061066, dated Feb. 4, 2014, 17 pages.
"International Search Report and Written Opinion", Application No. PCT/US2010/038730, dated Jan. 19, 2011, 8 pages.
"International Search Report and Written Opinion", Application No. PCT/US2011/055513, dated Mar. 27, 2012, 8 pages.
"International Search Report and Written Opinion", Application No. PCT/US2011/055514, dated May 22, 2012, 8 pages.
"International Search Report and Written Opinion", Application No. PCT/US2011/055512, dated May 24, 2012, 8 pages.
"International Search Report and Written Opinion", Application No. PCT/US2011/055520, dated May 9, 2012, 8 pages.
"International Search Report and Written Opinion", Application No. PCT/US2011/055524, dated Jun. 1, 2012, 8 pages.
"International Search Report and Written Opinion", Application No. PCT/US2011/065702, dated Aug. 29, 2012, 8 pages.
"International Search Report and Written Opinion", Application No. PCT/US2011/055736, dated Sep. 17, 2012, 8 pages.
"International Search Report and Written Opinion", Application No. PCT/US2011/067073, dated Sep. 17, 2012, 8 pages.
"International Search Report and Written Opinion", Application No. PCT/US2011/055511, dated Apr. 24, 2012, 9 pages.
"International Search Report and Written Opinion", Application No. PCT/US2011/055523, dated May 10, 2012, 9 pages.
"International Search Report and Written Opinion", Application No. PCT/US2011/055521, dated May 15, 2012, 9 pages.
"International Search Report and Written Opinion", Application No. PCT/US2011/055522, dated May 15, 2012, 9 pages.
"International Search Report and Written Opinion", Application No. PCT/US2011/055496, dated Sep. 12, 2012, 9 pages.
"International Search Report and Written Opinion", Application No. PCT/US2011/055712, dated Sep. 21, 2012, 9 pages.
"International Search Report and Written Opinion", Application No. PCT/US2011/055493, dated Sep. 26, 2012, 9 pages.
"International Search Report and Written Opinion", Application No. PCT/US2011/055478, dated Sep. 27, 2012, 9 pages.
"International Search Report and Written Opinion", Application No. PCT/US2011/055746, dated Sep. 27, 2012, 9 pages.
"International Search Report and Written Opinion", Application No. PCT/US2010/028553, Application Filing Date: Mar. 24, 2010, dated Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc., 2009, 153 pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x, Aug. 16, 2007, 2 pages.
"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.
"Magic mouse", Retrieved from: <http://www.apple.com/magicmouse/> on May 10, 2011, 3 pages.
"MIDTB Tip Sheet: Book Courier", Retrieved from: <http://www.midtb.org/tipsbookcourier.htm> on Dec. 11, 2008., Sep. 26, 2005, 6 Pages.

(56) References Cited

OTHER PUBLICATIONS

"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.

"moGo beta v.0.4", Retrieved from: <http://forum.xda-developers.com/showthread.php?t=375196> on Sep. 27, 2010, Mar. 7, 2008, 10 pages.

"Multi-touch", Retrieved from <http://en.wikipedia.org/wiki/Multi-touch#Microsoft_Surface> on Apr. 24, 2009, Apr. 17, 2009, 8 pages.

"New Features in WhatsUp Gold v12.0", retrieved from <http://www.netbright.co.th/?name=product&file=readproduct&id=12> on Jun. 10, 2011, 4 pages.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.

"Non-Final Office Action", U.S. Appl. No. 11/215,052, dated Jun. 23, 2011, 17 pages.

"Non-Final Office Action", U.S. Appl. No. 11/305,789, dated Sep. 21, 2009, 5 pages.

"Non-Final Office Action", U.S. Appl. No. 11/502,264, dated Sep. 30, 2009, 15 pages.

"Non-Final Office Action", U.S. Appl. No. 11/502,264, dated Sep. 14, 2012, 14 pages.

"Non-Final Office Action", U.S. Appl. No. 12/244,545, dated Mar. 27, 2012, 18 pages.

"Non-Final Office Action", U.S. Appl. No. 12/244,545, dated Aug. 17, 2011, 15 pages.

"Non-Final Office Action", U.S. Appl. No. 12/413,977, dated Jul. 19, 2011, 17 pages.

"Non-Final Office Action", U.S. Appl. No. 12/413,977, dated Jul. 20, 2012, 18 pages.

"Non-Final Office Action", U.S. Appl. No. 12/414,382, dated Jul. 26, 2011, 9 pages.

"Non-Final Office Action", U.S. Appl. No. 12/414,434, dated Jan. 17, 2012, 7 pages.

"Non-Final Office Action", U.S. Appl. No. 12/414,434, dated May 31, 2012, 7 pages.

"Non-Final Office Action", U.S. Appl. No. 12/414,434, dated Aug. 2, 2011, 6 pages.

"Non-Final Office Action", U.S. Appl. No. 12/414,455, dated Aug. 29, 2011, 8 pages.

"Non-Final Office Action", U.S. Appl. No. 12/414,458, dated Jul. 6, 2011, 8 pages.

"Non-Final Office Action", U.S. Appl. No. 12/414,476, dated Nov. 9, 2012, 22 pages.

"Non-Final Office Action", U.S. Appl. No. 12/414,476, dated Aug. 3, 2011, 21 pages.

"Non-Final Office Action", U.S. Appl. No. 12/433,605, dated Jun. 24, 2011, 10 pages.

"Non-Final Office Action", U.S. Appl. No. 12/433,667, dated Jun. 7, 2011, 15 pages.

"Non-Final Office Action", U.S. Appl. No. 12/433,667, dated Feb. 3, 2012, 16 pages.

"Non-Final Office Action", U.S. Appl. No. 12/469,419, dated Nov. 9, 2011, 15 pages.

"Non-Final Office Action", U.S. Appl. No. 12/469,419, dated May 23, 2012, 13 pages.

"Non-Final Office Action", U.S. Appl. No. 12/469,458, dated Jul. 1, 2011, 15 pages.

"Non-Final Office Action", U.S. Appl. No. 12/469,458, dated Sep. 21, 2012, 14 pages.

"Non-Final Office Action", U.S. Appl. No. 12/469,480, dated Oct. 17, 2012, 16 pages.

"Non-Final Office Action", U.S. Appl. No. 12/469,480, dated Sep. 22, 2011, 14 pages.

"Non-Final Office Action", U.S. Appl. No. 12/470,558, dated Nov. 22, 2011, 9 pages.

"Non-Final Office Action", U.S. Appl. No. 12/480,969, dated Aug. 7, 2012, 15 pages.

"Non-Final Office Action", U.S. Appl. No. 12/484,799, dated Aug. 11, 2011, 12 pages.

"Non-Final Office Action", U.S. Appl. No. 12/484,799, dated Aug. 7, 2012, 13 pages.

"Non-Final Office Action", U.S. Appl. No. 12/484,845, dated Dec. 7, 2011, 16 pages.

"Non-Final Office Action", U.S. Appl. No. 12/560,081, dated Dec. 7, 2011, 16 pages.

"Non-Final Office Action", U.S. Appl. No. 12/972,967, dated Jan. 30, 2013, 19 pages.

"Non-Final Office Action", U.S. Appl. No. 12/977,584, dated Dec. 7, 2012, 8 pages.

"Non-Final Office Action", U.S. Appl. No. 12/978,184, dated Jan. 23, 2013, 7 pages.

"Non-Final Office Action", U.S. Appl. No. 12/983,106, dated Nov. 9, 2012, 17 pages.

"Non-Final Office Action", U.S. Appl. No. 13/118,339, dated Feb. 11, 2013, 15 pages.

"Non-Final Office Action", U.S. Appl. No. 13/118,347, dated Feb. 12, 2013, 14 pages.

"Non-Final Office Action", U.S. Appl. No. 13/196,272, dated Feb. 6, 2013, 10 pages.

"Non-Final Office Action", U.S. Appl. No. 13/224,258, dated Jan. 8, 2013, 35 pages.

"Non-Final Office Action", U.S. Appl. No. 13/492,495, dated Dec. 19, 2012, 6 pages.

"Non-Final Office Action", U.S. Appl. No. 13/492,495, dated Sep. 17, 2012, 8 pages.

"Non-Final Office Action", U.S. Appl. No. 13/655,386, dated Dec. 26, 2012, 23 pages.

"Non-Final Office Action", U.S. Appl. No. 13/655,390, dated Dec. 17, 2012, 12 pages.

"Non-Final Office Action", U.S. Appl. No. 13/656,354, dated Feb. 6, 2013, 10 pages.

"Non-Final Office Action", U.S. Appl. No. 13/656,574, dated Jan. 31, 2013, 21 pages.

"Non-Final Office Action", U.S. Appl. No. 13/657,621, dated Feb. 7, 2013, 19 pages.

"Non-Final Office Action", U.S. Appl. No. 13/657,646, dated Jan. 3, 2013, 13 pages.

"Non-Final Office Action", U.S. Appl. No. 13/657,789, dated Jan. 9, 2013, 38 pages.

"Non-Final Office Action", U.S. Appl. No. 13/904,880, dated Mar. 18, 2016, 10 pages.

"Non-Final Office Action", U.S. Appl. No. 13/904,880, dated May 4, 2015, 22 pages.

"Non-Final Office Action", U.S. Appl. No. 14/089,149, dated Nov. 3, 2014, 8 pages.

"Non-Final Office Action", U.S. Appl. No. 14/109,779, dated Nov. 21, 2014, 9 pages.

"Non-Final Office Action", U.S. Appl. No. 14/659,442, dated Jul. 7, 2015, 7 pages.

"Non-Final Office Action", U.S. Appl. No. 14/918,358, dated Oct. 13, 2016, 9 pages.

"Non-Final Office Action", U.S. Appl. No. 14/918,359, dated Nov. 22, 2016, 9 pages.

"Non-Final Office Action", U.S. Appl. No. 14/919,607, dated Sep. 23, 2016, 11 pages.

"Non-Final Office Action", U.S. Appl. No. 15/235,359, dated Feb. 8, 2017, 9 pages.

"Notice of Allowance", U.S. Appl. No. 11/215,052, dated Mar. 14, 2012, 5 pages.

"Notice of Allowance", U.S. Appl. No. 11/305,789, dated Nov. 23, 2009, 8 pages.

"Notice of Allowance", U.S. Appl. No. 12/414,382, dated Apr. 4, 2012, 4 pages.

"Notice of Allowance", U.S. Appl. No. 12/414,434, dated Aug. 17, 2012, 4 pages.

"Notice of Allowance", U.S. Appl. No. 12/414,455, dated Jan. 4, 2012, 4 pages.

"Notice of Allowance", U.S. Appl. No. 12/414,458, dated Oct. 31, 2011, 2 pages.

(56) References Cited

OTHER PUBLICATIONS

"Notice of Allowance", U.S. Appl. No. 12/414,458, dated Nov. 29, 2011, 2 pages.
"Notice of Allowance", U.S. Appl. No. 12/414,458, dated Aug. 10, 2011, 6 pages.
"Notice of Allowance", U.S. Appl. No. 12/470,558, dated Apr. 2, 2012, 7 pages.
"Notice of Allowance", U.S. Appl. No. 12/470,558, dated Aug. 23, 2012, 2 pages.
"Notice of Allowance", U.S. Appl. No. 12/484,799, dated Oct. 22, 2012, 10 pages.
"Notice of Allowance", U.S. Appl. No. 12/484,845, dated Mar. 16, 2012, 5 pages.
"Notice of Allowance", U.S. Appl. No. 12/977,584, dated Jun. 19, 2013, 5 pages.
"Notice of Allowance", U.S. Appl. No. 12/978,184, dated Nov. 6, 2013, 5 pages.
"Notice of Allowance", U.S. Appl. No. 12/978,184, dated Aug. 2, 2013, 5 pages.
"Notice of Allowance", U.S. Appl. No. 13/655,390, dated May 24, 2013, 5 pages.
"Notice of Allowance", U.S. Appl. No. 13/904,880, dated May 10, 2016, 15 pages.
"Notice of Allowance", U.S. Appl. No. 14/089,149, dated Dec. 5, 2014, 4 pages.
"Notice of Allowance", U.S. Appl. No. 14/109,779, dated Jun. 17, 2015, 4 pages.
"Notice of Allowance", U.S. Appl. No. 14/659,442, dated Aug. 19, 2015, 4 pages.
"Notice of Allowance", U.S. Appl. No. 14/918,358, dated Sep. 1, 2017, 5 pages.
"Notice of Allowance", U.S. Appl. No. 14/919,607, dated Apr. 14, 2017, 7 pages.
"Notice of Allowance", U.S. Appl. No. 15/235,359, dated Jun. 7, 2017, 9 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"Onyx Graphics Announces New Onyx Prepedge Job Preparation Software", retrieved from <http://www.largeformatreview.com/rip-software/433-onyx-graphics-announces-new-onyx-> on May 10, 2011, 2 pages.
"Oracle8i Application Developer's Guide—Advanced Queuing Release 2 (8.1.6)", Retrieved from: http://www.cs.otago.ac.nz/oradocs/appdev.817/a76938/adq0lin5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Push Notifications Overview for Windows Phone", Retrieved from: >http://msdn.microsoft.com/en-us/library/ff402558%28VS.92%29.aspx> on Sep. 30, 2010, Sep. 3, 2010, 1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Restriction Requirement", U.S. Appl. No. 13/658,694, dated Feb. 6, 2013, 6 pages.
"SecureMe—Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, Dec. 15, 2008, 3 pages.
"Snap", Windows 7 Features—retrieved from <http://windows.microsoft.com/en-US/windows7/products/features/snap>; on Sep. 23, 2011, 2 pages.
"Supplemental Notice of Allowance", U.S. Appl. No. 12/977,584, dated Sep. 16, 2013, 2 pages.
"Supplemental Notice of Allowance", U.S. Appl. No. 12/977,584, dated Oct. 11, 2013, 2 pages.
"Supplemental Notice of Allowance", U.S. Appl. No. 12/978,184, dated Feb. 25, 2014, 2 pages.
"Supplemental Notice of Allowance", U.S. Appl. No. 13/655,390, dated Sep. 19, 2013, 2 pages.
"Supplemental Notice of Allowance", U.S. Appl. No. 13/655,390, dated Jul. 25, 2013, 2 pages.
"Supplemental Notice of Allowance", U.S. Appl. No. 14/089,149, dated Mar. 20, 2015, 2 pages.
"Supplemental Notice of Allowance", U.S. Appl. No. 15/235,359, dated Jul. 19, 2017, 5 pages.
"Symbian Applications", Retrieved from: <http://symbianfullversion.blogspot.com/2008_12_01_archive.html> on May 5, 2009., Jan. 2009, 51 Pages.
"The Map Screen", retrieved from <http://www.symbianos.org/whereamiusersguide> on Jun. 17, 2011, 3 pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", Msoffice tutorial!—retrieved from <http://www.msoffice-tutorial.com/working-with-multiple-windows.php> on Sep. 23, 2011, 3 pages.
"YUI 3: ScrollView [beta]", Retrieved from: <http://developer.yahoo.com/yui/3/scrollview/> on Sep. 28, 2010, 5 pages.
Al"Droptiles—Metro Style Live Tiles Enabled Web 2.0 Dashboard", Retrieved from <http://oazabir.github.com/Droptiles/> on Mar. 5, 2013, Jul. 18, 2012, 7 pages.
Bates,"A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf>, 1996, 8 pages.
Beiber,"Screen Coverage: A Pen-Interaction Problem for PDA's and Touch Screen Computers", In Proceedings of ICWMC 2007, Mar. 2007, 6 pages.
Bjork,"Redefining the Focus and Context of Focus+Context Visualizations", In Proceedings of INFOVIS 2000—Available at <http://www.johan.redstrom.se/papers/redefining.pdf>, Oct. 2000, 9 pages.
Blankenburg,"31 Days of Mango | Day #11: Live Tiles", Retrieved from <http://www.jeffblankenburg.com/2011/11/11/31-days-of-mango-day-11-live-tiles/> on Mar. 5, 2013, Nov. 11, 2011, 10 pages.
Bowes,"Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.

(56) References Cited

OTHER PUBLICATIONS

Buring,"User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf>, Sep. 2006, pp. 829-836.
Carrera,"Conserving Disk Energy in Network Servers", available at <http://citeseerx.ist.psu.edu/viewdoc/download?doi=10.1.1.6.8301&rep=rep1&type=ps>, Nov. 2002, 15 pages.
Cawley,"How to Customize Your Windows Phone 7", Retrieved from: <http://www.brighthub.com/mobile/windows-mobile-platform/articles/9521- 3.aspx> on May 10, 2011, Nov. 12, 2010, 3 pages.
Cawley,"Windows Phone 7 Customization Tips and Tricks", retrieved from <http://www.brighthub.com/mobile/windows-mobile-platform/articles/95213.aspx> on Jun. 20, 2011, May 16, 2011, 2 pages.
Cohen,"Wang Tiles for Image and Texture Generation", In Proceedings of SIGGRAPH 2003—Available <http://research.microsoft.com/en-us/um/people/cohen/WangFinal.pdf>, 2003, 8 pages.
Damien,"7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.
Davis,"A WPF Custom Control for Zooming and Panning", Retrieved from: <http://www.codeproject.com/KB/WPF/zoomandpancontrol.aspx> on Sep. 28, 2010, Jun. 29, 2010, 21 pages.
Delimarsky,"Sending Tile Push Notifications on Windows Phone 7", retrieved from <http://mobile.dzone.com/articles/sending-tile-push>60 on May 10, 2011, Aug. 25, 2010, 2 pages.
Denoue,"WebNC: Efficient Sharing of Web Applications", In Proceedings of WWW 2009—Available at <http://www.fxpal.com/publications/FXPAL-PR-09-495.pdf>, 2009, 2 pages.
Dolcourt,"Webware", Retrieved from: <http://news.cnet.com/webware/?categoryId=2010> on May 5, 2009., May 5, 2009, 13 Pages.
Dunsmuir,"Selective Semantic Zoom of a Document Collection", Available at <http://www.cs.ubc.ca/~tmm/courses/533/projects/dustin/proposal.pdf>, Oct. 30, 2009, pp. 1-9.
Egan,"Modifying Live Tiles in a Background Process", Retrieved from <http://thesociablegeek.com/windows-8/livetiles/modifying-live-tiles-in-a-background-process/22 on Mar. 5, 2013, Aug. 31, 2012, 24 pages.
Fisher,"Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.
Gade,"Samsung Alias u740", Retrieved from: <http://www.mobiletechreview.com/phones/Samsung-U740.htm> on Nov. 20, 2008, Mar. 14, 2007, 6 pages.
Gao,"A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.
Ha,"SIMKEYS: An Efficient Keypad Configuration for Mobile Communications", Retrieved from: <http://ieeexplore.ieee.org/stamp/stamp.jsp?arnumber=01362557.> on Dec. 17, 2008, Nov. 2004, 7 Pages.
Harrison,"Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press, Jun. 16, 2003, 4 pages.
Hickey,"Google Android has Landed; T-Mobile, HTC Unveil G1", Retrieved from: <http://www.crn.com/retail/210603348> on Nov. 26, 2008., Sep. 23, 2008, 4 pages.
Janecek,"An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>, Feb. 15, 2005, pp. 1-15.
Kcholi,"Windows CE .NET Interprocess Communication", Retrieved from http://msdn.microsoft.com/en-us/library/ms836784.aspx on Jul. 17, 2008., Jan. 2004, 15 Pages.
La,"Parallax Gallery", Available at <http://webdesignerwall.comtutorials/parallax-gallery/comment-page-1>, Apr. 25, 2008, 16 pages.
Livingston,"Windows 95 Secrets", 1995, I DG Books Worldwide, 3rd Edition, 1995, pp. 121-127.
Long,"Gmail Manager 0.6", Retrieved from: <https://addons.mozilla.org/en-US/firefox/addon/1320/> on Sep. 29, 2010, Jan. 27, 2010, 4 pages.
Mann,"Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.
Mantia,"Multitasking: What Does It Mean?", retrieved from <http://mantia.me/blog/multitasking/> on Sep. 23, 2011, 3 pages.
Mao,"Comments of Verizon Wireless Messaging Services, LLC", Retrieved from: http://www.ntia.doc.gov/osmhome/warnings/comments/verizon.htm on May 6, 2009., Aug. 18, 2000, 5 Pages.
Marie,"MacBook Trackpad Four Fingers Swipe Left/Right to Switch Applications", MacBook Junkie—retrieved from <http://www.macbookjunkie.com/macbook-trackpad-four-fingers-swipe-left-right-to-switch-applications/> on May 11, 2011, Nov. 13, 2010, 4 pages.
Mei,"Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.
Nordgren,"Development of a Touch Screen Interface for Scania Interactor", Master's Thesis in C—Available at <http://www.cs.umu.se/education/examina/Rapporter/PederNordgren.pdf>;omputing Science, UMEA University, Apr. 10, 2007, pp. 1-59.
Oliver,"Potential iPhone Usability and Interface Improvements", Retrieved from: <http://www.appleinsider.com/articles/08/09/18/potential_iphone_usability_and_interface_improvements.html>; on Nov. 12, 2008, AppleInsider, Sep. 18, 2008, 4 pages.
Oryl,"Review: Asus P527 Smartphone for North America", Retrieved from: <http://www.mobileburn.com/review.jsp?Id=4257> on Dec. 17, 2008., Mar. 5, 2008, 1 Page.
Padilla,"Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul,"Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.
Pendharkar,"Fluid Home Screen for Mobile Phones", Helsinki Metropolia University of Applied Sciences, Master of Engineering, Information Technology, Thesis, Available at <http://theseus17-kk.lib.helsinki.fi/bitstream/handle/10024/46481/FinalThesis3.pdf?sequence=1/>, Apr. 12, 2012, 48 pages.
Perry,"Teach Yourself Windows 95 in 24 Hours", 1997, Sams Publishing, 2nd Edition, 1997, pp. 193-198.
Raghaven,"Model Based Estimation and Verification of Mobile Device Performance", Available at http://alumni.cs.ucsb.edu/~raimisl/emsoft04_12.pdf., Sep. 27-29, 2004, 10 Pages.
Rathbone,"Windows Phone 7 Live Tile Schedules—How to Execute Instant Live Tile Updates", Retrieved from <http://www.diaryofaninja.com/blog/2011/04/03/windows-phone-7-live-tile-schedules-ndash-executing-instant-live-tile-updates> on Mar. 11, 2013, Apr. 3, 2011, 8 pages.
Ray,"Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.
Reed,"Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.
Remond,"Mobile Marketing Solutions", Retrieved from: <http://www.mobilemarketingmagazine.co.uk/mobile_social_networking/> on May 5, 2009., Apr. 28, 2009, 16 Pages.

(56) References Cited

OTHER PUBLICATIONS

Rice,"A System for Searching Sound Palettes", Proceedings of the Eleventh Biennial Symposium on Arts and Technology,, Available at <http://www.comparisonics.com/FindSoundsPalettePaper.pdf>, Feb. 2008, 6 pages.
Ritchie,"iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.
Ritscher,"Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.
Roberts,"Touching and Gesturing on the iPhone", Available at <http://www.sitepen.com/blog/2008/07/10/touching-and-gesturing-on-the-iphone/comments-pare-1>, Jul. 10, 2008, 16 pages.
Sandoval,"A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>, 2004, 18 pages.
Singh,"CINEMA: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.
Smith,"GroupBar: The TaskBar Evolved", Proceedings of OZCHI 2003—Available at <http://research.microsoft.com/pubs/64316/ozchi2003-groupbar.pdf>, Nov. 2003, pp. 1-10.
Steinicke,"Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>, Jun. 15, 2008, 4 Pages.
Suror,"PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.
Terpstra,"Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.
Vallerio,"Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.
Vermeulen,"BlackBerry PlayBook Hands-on", retrieved from <http://mybroadband.co.za/news/gadgets/20104-BlackBerry-PlayBook-hands-.html> on May 11, 2011, May 8, 2011, 4 pages.
Viticci,"Growl 1.3 to Be Released on Mac App Store, Introduce Lion Support and Drop GrowlMail Support", Retrieved from: <http://www.macstories.net/stories/grow1-1-3-to-be-released-on-mac-app-store-introduce-lion-support-and-drop-growlmail-support/> on Jul. 22, 2011, Jul. 6, 2011, 6 pages.
Vornberger,"Bluetile", Retrieved from: <http://www.bluetile.org> on Sep. 29, 2010, 5 pages.
Wilson,"How the iPhone Works", Retrieved from: <http://electronics.howstuffworks.com/iphone2.htm> on Apr. 24, 2009, Jan. 2007, 9 pages.
Wilson,"Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.
Wobbrock,"User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.
Wu "Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.
Wyatt,"/Flash/the art of parallax scrolling", .net Magazine, Aug. 1, 2007, pp. 74-76.
Yang,"Semantic Photo Album Based on MPEG-4 Compatible Application Format", Retrieved from: <http://ieeexplore.ieee.org/stamp/stamp.jsp?arnumber=04146254.>, 2007, 2 Pages.
"First Office Action and Search Report Issued in Chinese Patent Application No. 201380077008.1", dated Feb. 24, 2018, 21 Pages.
"Corrected Notice of Allowance", U.S. Appl. No. 14/918,358, dated Oct. 4, 2017, 2 pages.
"Corrected Notice of Allowance", U.S. Appl. No. 14/918,358, dated Nov. 13, 2017, 2 pages.
"Corrected Notice of Allowance", U.S. Appl. No. 14/918,359, dated Oct. 4, 2017, 2 pages.
"Corrected Notice of Allowance", U.S. Appl. No. 14/918,359, dated Nov. 14, 2017, 2 pages.
"Foreign Office Action", CA Application No. 2,847,180, dated Aug. 17, 2017, 5 pages.
"Notice of Allowance", U.S. Appl. No. 14/918,359, dated Sep. 7, 2017, 5 pages.
"Supplemental Notice of Allowance", U.S. Appl. No. 14/918,358, dated Sep. 15, 2017, 2 pages.
Duino,"Google Testing Complete Redesign of 'My Apps' Section of Google Play, Includes Sort Option", Retrieved from <<https://9to5google.com/2017/02/03/google-testing-redesign-my-apps-section-google-play-sort-option/>>, Feb. 3, 2017, 5 pages.
Vincent,"A First Look at the Google Play Store Redesign", Retrieved from <<https://www.theverge.com/2015/10/16/9549121/google-play-redesign>>, Oct. 16, 2015, 2 pages.
Welch,"Android Just Got Incredibly Good at Helping You Manage Your Apps", Retrieved from <<https://www.theverge.com/2017/4/19/15360278/android-my-apps-google-play-store-redesign-update-sort>>, Apr. 19, 2017, 5 pages.
Whitwam,"[Update #2: 4.8.22] Latest Google Play Store 4.8.22 With PayPal Support, Simplified App Permissions, Bigger Buttons, and More [APK Download]", Retrieved from <<http://www.androidpolice.com/2014/07/15/google-rolling-out-play-store-v4-8-19-with-paypal-support-simplified-app-permissions-bigger-buttons-and-more-apk-download/>>, Jul. 15, 2014, 8 page.

LIVE TILES WITHOUT APPLICATION-CODE EXECUTION

RELATED APPLICATIONS

This application is a continuation of and claims priority to U.S. patent application Ser. No. 15/235,359 filed Aug. 12, 2016 entitled "Live Tiles Without Application-Code Execution", the disclosure of which is incorporated by reference herein in its entirety. U.S. patent application Ser. No. 15/235,359 is a continuation of and claims priority to U.S. patent application Ser. No. 13/904,880 filed May 29, 2013 entitled "Live Tiles Without Application-Code Execution" the disclosure of which is incorporated by reference herein in its entirety.

BACKGROUND

Conventional techniques provide content for tiles by executing code of applications associated with each tile. Doing so, however, has significant security issues. Allowing an application to execute code on a client's device exposes the client device to numerous malicious actions. This is especially true for small applications ("apps") common to mobile devices, as users often have tens and even hundreds of apps on their mobile devices. For each of these apps that is allowed to run code on the client device, the risk of malicious action increases commensurately.

These security issues can be addressed by sandboxing or otherwise blocking out each of the apps. Doing so, however, can be both slow and use significant resources, especially when many apps need to execute on the device. Thus, permitting code of applications associated with tiles to execute can be unsafe, slow, or consume substantial computing resources.

SUMMARY

This document describes techniques enabling live tiles without application-code execution. These techniques permit live content to be presented in tiles without executing code of applications associated with those tiles. By so doing, live tiles may be presented more safely, faster, or using fewer resources.

This summary is provided to introduce simplified concepts enabling live tiles without application-code execution, which is further described below in the Detailed Description. This summary is not intended to identify essential features of the claimed subject matter, nor is it intended for use in determining the scope of the claimed subject matter. Techniques and/or apparatuses enabling live tiles without application-code execution are also referred to herein separately or in conjunction as the "techniques" as permitted by the context.

BRIEF DESCRIPTION OF THE DRAWINGS

Embodiments enabling live tiles without application-code execution are described with reference to the following drawings. The same numbers are used throughout the drawings to reference like features and components.

DETAILED DESCRIPTION

Overview

This document describes techniques and apparatuses enabling live tiles without application-code execution. These techniques enable a user to see live content within tiles, including without executing code of applications associated with those tiles.

In some cases the techniques enable a live-tile user interface having numerous live tiles displaying content of associated applications. In doing so, however, code of these applications does not need to be executed. Instead, an indicator of the application, such as one stored in non-executing metadata of the application, indicates a source for content of the application. The techniques may then retrieve this content from the source and present the content in the tile associated with that application. The techniques may do so in a secure manner by leveraging a trusted operating-system component to download live content on behalf of the applications.

Furthermore, in some cases, a user may wish to interact with content on a new device or unknown device. Assume that the user would like to interact with content associated with his or her applications, such as through a user interface having many live tiles showing that content. Assume also that the user is using a new device or some temporary device, such as a friend's mobile device, a computer at an internet café or library, or some other new or temporary device. Current solutions for providing live content may require installation of these applications, which as noted can be tens or even hundreds of applications. Doing so consumes extraordinary amounts of resources and, in some cases, is so slow that the user experience is poor.

Through use of the techniques, however, executing or even installing the applications can be avoided. Instead of having to install, for example, 50 applications to execute code of those applications to retrieve content for 50 live tiles, no applications are installed. The techniques determine a source for the content, such as through metadata of the applications or some record of the user's applications, and thereby retrieve the content for presentation within the live tiles.

Not only can the techniques reduce resource usage, improve performance, or increase security, in many cases the techniques also make application development easier. No longer does an application developer develop code for providing content to live tiles, instead, the application developer needs only include or provide some sort of indicator to show where content for the application can be retrieved.

These are but a few examples in which the techniques enable live tiles. Numerous other examples, as well as ways in which the techniques operate, are described below. This discussion proceeds to describe an example environment in which the techniques may operate, methods performable by the techniques, and an example apparatus below.

Example Environment

Figure 1:
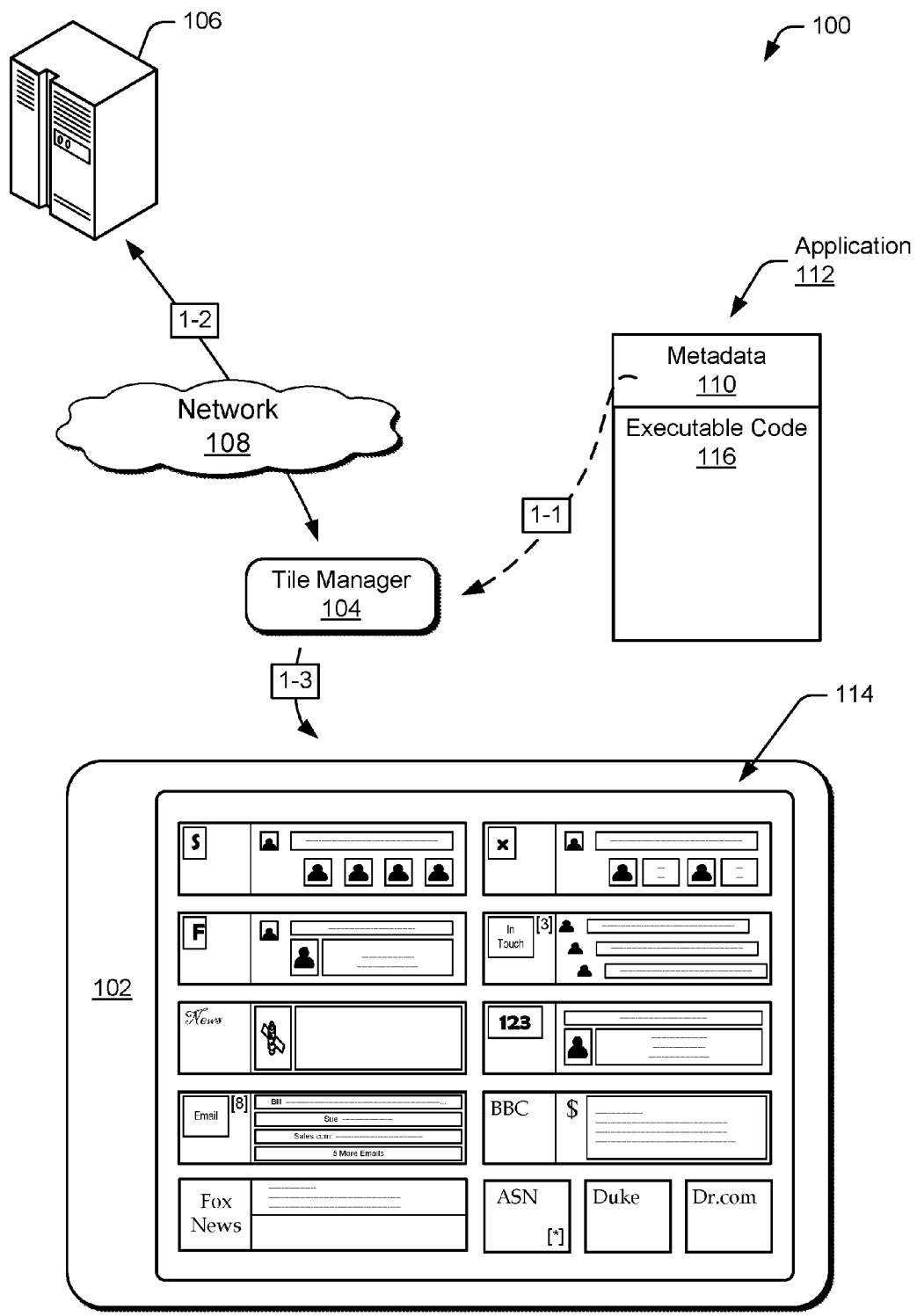
FIG. 1 illustrates an example system in which techniques enabling live tiles without application-code execution can be implemented.

FIG. 1 illustrates an example environment 100 in which techniques enabling live tiles without application-code execution can be embodied. Environment 100 includes a computing device 102 having a tile manager 104, content source 106, and communication network 108, which enables communication across various networks. In this illustration, computing device 102, through tile manager 104, receives or retrieves metadata 110 of application 112, shown at arrow 1-1. With this metadata 110, tile manager 104 retrieves content through communication network 108 and from content source 106, shown at arrow 1-2. Tile manager 104 then, shown at arrow 1-3, presents content within a live tile associated with application 112 and in live-tile interface 114. Note that executable code 116 of application 112 is not executed, nor is it used to gain the content. Executable code 116 is shown for context, though it (and even application 112 in some cases), need not be stored on, installed on, or even accessible by computing device 102.

Content can include what is new or of potential interest for application 112, such as a new email, entry, article, picture, video, song, or indication that a software update or expiration is approaching. New content is content that is determined to be, or is likely to be, newly presented to a user associated with live-tile interface 114. Thus, content that has not previously been presented in a tile, or has not been presented since the user last opened live-tile interface 114, whether on computing device 102 or some other device, can be considered new content.

Other content, however, can also be shown, such as content seen previously but known, or likely to be, of interest to the user. Examples include an indication that a subscription is expiring and must be renewed, an indication that the user has selected to be maintained, such as a number of seats left at a particular showing of a movie that the user is interested in seeing at that time, or newest content for the application even if it was previously presented to the user.

While not required, content within a live tile can be directed to a single set of larger content, such as presenting one image and a headline for a news article that, if presented by the application, would have ten pictures and five pages of text. Further, multiple content can be presented within a live tile at one time, or can be rotated on and off, or both.

Figure 2:
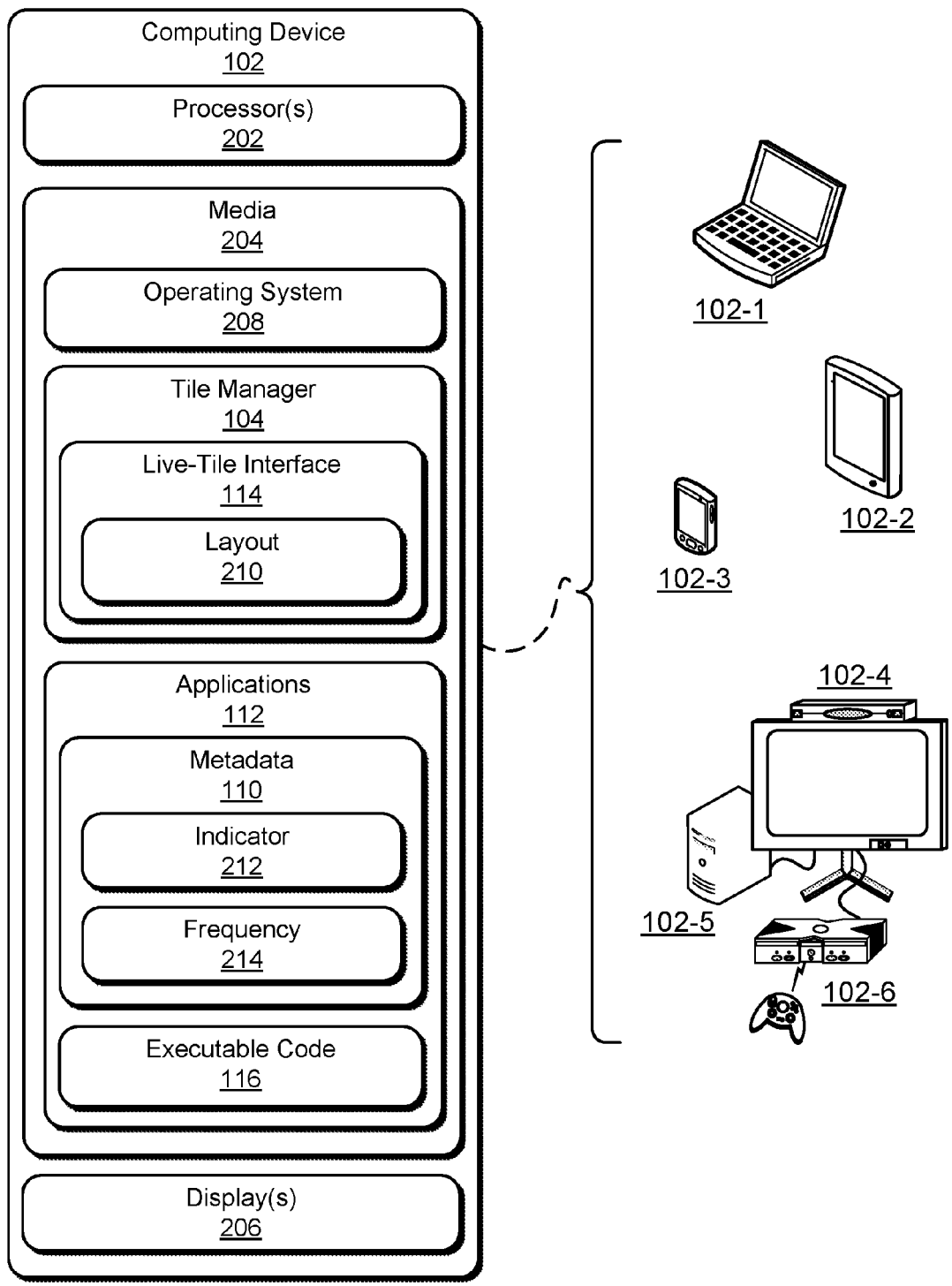
FIG. 2 illustrates an example embodiment of the computing device of FIG. 1.

FIG. 2 illustrates an example embodiment of computing device 102 of FIG. 1, which is illustrated with six examples devices: a laptop computer 102-1, a tablet computer 102-2, a smart phone 102-3, a set-top box 102-4, a desktop computer 102-5, and a gaming device 102-6, though other computing devices and systems, such as servers and netbooks, may also be used.

Computing device 102 includes or has access to computer processor(s) 202, computer-readable storage media 204 (media 204), and one or more displays 206, four examples of which are illustrated in FIG. 2. Media 204 includes an operating system 208, tile manager 104, and applications 112, each of which may include metadata 110 and executable code 116.

Tile manager 104 is capable of enabling live tiles without application-code execution. As noted above, the techniques, here through tile manager 104, are capable of presenting content within tiles. This content is associated with, but not generated by, executing code of applications 112. Thus, while media 204 may include applications 112, and metadata 110 and executable code 116 thereof, execution is not needed to present content in live tiles associated with applications 112. Further, in various examples described herein, tile manager 104 may operate without computing device 102 storing, executing, or even installing applications 112. Therefore, tile manager 104 may operate without applications 112 executing application code, even small portions of application code, thereby making content presentation in live tiles more secure.

Tile manager 104 includes live-tile interface 114, which is capable of presenting content in live tiles associated with multiple applications, such as the twelve different live tiles illustrated in FIG. 1 and their respective applications. In some cases, live-tile interface 114 presents live tiles in a particular layout 210, which may be configured by tile manager 104 by default, by frequency of usage, or by user selection.

As noted, applications 112 include, or are associated with, metadata 110. Metadata 110 is, or may include, non-executable properties associated with application 112. Metadata 110 may include indicator 212 and frequency 214, as well as other properties, such as a format in which to present content (e.g., one image on left, text only on right, and so forth). Indicator 212 provides sufficient information for tile manager 104 to retrieve content associated with the application, which may simply identify the application, a link to new or all content, or a universal resource locator (URL) usable by tile manager 104 to retrieve content.

Frequency 214 is associated with application 112, and can be used by tile manager 104 to determine a frequency at which to retrieve content for application 112, such as repetitively at frequency 214. Frequency 214 may also, or instead, be used as part of establishing a data push from content source 106. For example, content source 106 may be configured to push content to computing device 102 at, or based on, frequency 214. In both cases, content can be received or retrieved only when new or regardless of whether the content is new to the user. While metadata 110 can be or include non-executable properties, metadata 110 can be written in various markup languages or formats, such as eXtensible markup language (XML), hypertext markup language (HTML), or really simple syndication (RSS), just to name a few. By so doing, tile manager 104 may easily parse metadata 110 for indicator 212 and frequency 214. Note that indicator 212 and/or frequency 214 may be received or used without necessarily receiving metadata 110, as will be described in greater detail below.

Ways in which entities of FIGS. 1 and 2 act and interact vary and are set forth in greater detail below. The entities illustrated for computing device 102, as well as content source 106, can be separate or integrated.

Example Methods

Figure 3:
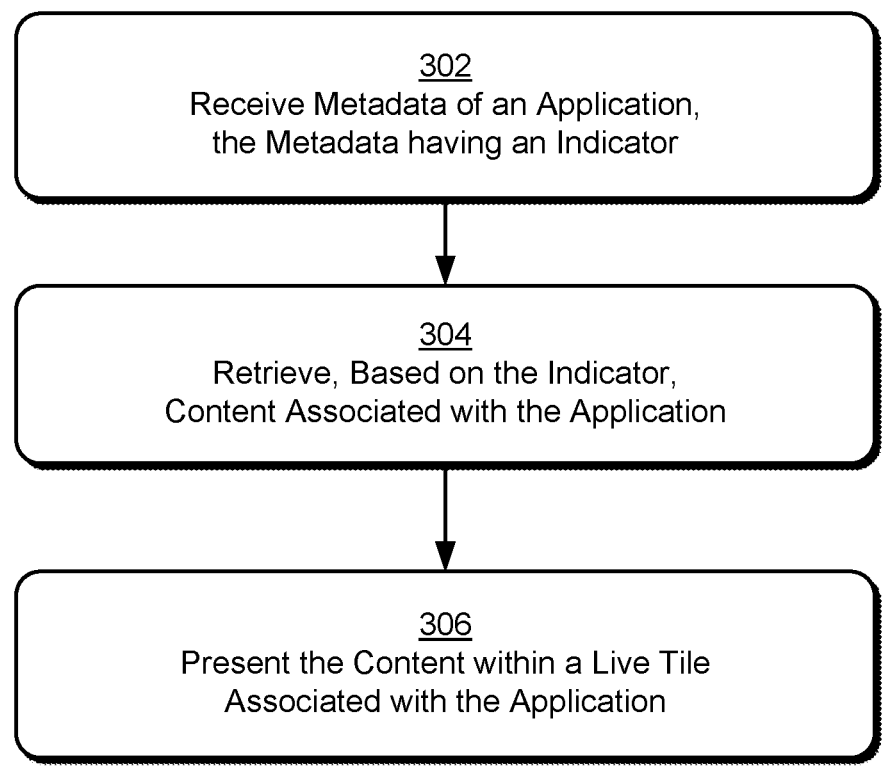
FIG. 3 illustrates methods enabling live tiles without application-code execution.

FIG. 3 depicts a method 300 for enabling live tiles without application-code execution. In portions of the following discussion reference may be made to environment 100 of FIG. 1 and/or entities of FIG. 2, reference to which is made for example only. The order in which the following methods are described is not intended to be construed as a limitation, and any number or combination of the described method operations can be performed in any order to perform a method, or an alternate method for enabling live tiles without application-code execution.

Block 302 receives metadata of an application, the metadata having an indicator. As noted above, tile manager 104 may receive this metadata by registering or installing an application, though in some cases it may instead be received or retrieved from a remote source, such as content source 106. By way of example only, consider tile manager 104, which receives metadata 110 when registering application 112 but without executing executable code 116 of application 112.

Block 304 retrieves, based on the indicator, content associated with the application. In the ongoing example, assume that tile manager 104 downloads data from a URL of content source 106 based on the indicator, the URL associated with the particular application. Further, assume that tile manager 104 determines, from user records or content source 106, that one particular piece of the content available at the URL is new since the content for the application was last presented in a live tile to this user.

Block 306 presents, within a live tile associated with the application, the content within the live tile. The content may also be presented within a live-tile user interface having multiple other live tiles associated with other applications. As noted above, the acts of receiving metadata of the application, retrieving the content associated with the application, and presenting the content within the live tile can be performed without executing application code.

Figure 4:
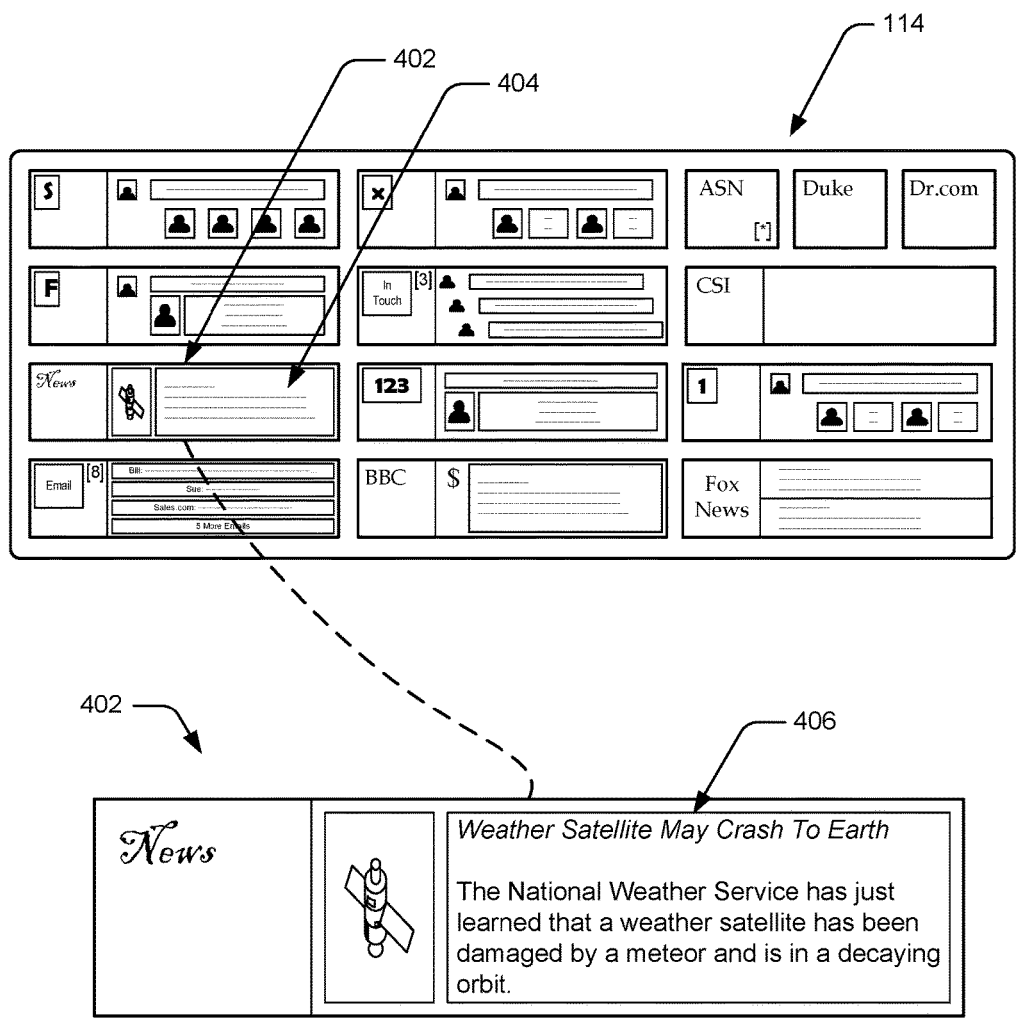
FIG. 4 illustrates an example live-tile interface having fourteen live tiles.

Concluding the present example, assume that tile manager 104 presents another example of live-tile interface 114, shown in FIG. 4. This live-tile interface 114 includes fourteen live tiles, eleven of them relatively large and three relatively small. The live tile of interest in this example is live tile 402, which is associated with a News application. The content new since the user was last presented content for this application concerns a weather satellite. This content 404 is shown in expanded form at 406 as well to illustrate that, while live tiles may be fairly small, meaningful new content can be presented within them. Here, a user may see this new content and determine that, without executing the associated News application, the article is or is not interesting. In some cases, the user may determine that sufficient content relating to the article has been shown and thus, while the article is interesting, the user need not take the time to read the full article.

As noted in part above, where multiple content changes for an application are retrieved, tile manager 104 may present the newest of the content changes or rotate through these content changes. In any case, however, new content permits live tiles to maintain a live feel for live-tile interface 114. The term live tile is intended to represent the updating of content for tiles, in contrast to a tile that does not change. Thus, a tile in which new content is presented, whether the content is animated, moving, rotating or not, enables the tile to be live to the user.

In this context, assume that the user viewed live tile 402 at 9 A.M. and, on viewing live-tile interface 114 at 3 P.M., is presented with live tile 402 reporting content new since to the News application since 9 A.M. Here the new content is the article concerning a weather satellite that has been damaged by a meteor and may crash to earth. Content 406 shows content (or a portion thereof) for the news article that is now available at the News application website, here with an image of a satellite, a title of the article, and a first sentence of the article.

Note also that tile manager 104 may, via live-tile interface 114, present content for multiple applications all at one time, one-at-a-time (e.g., in rapid progression), after compiling into batches, and/or at a frequency associated with each respective application.

Figure 5:
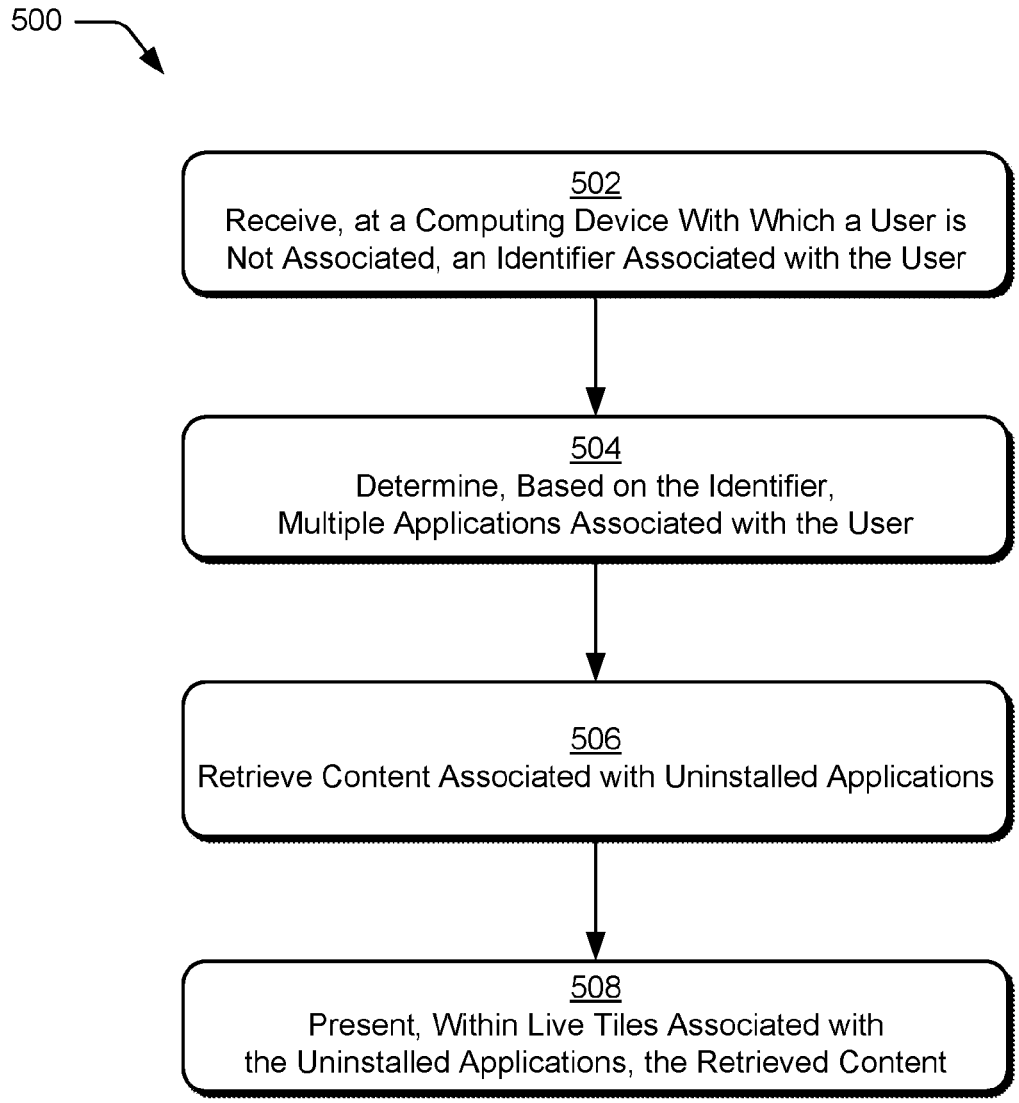
FIG. 5 illustrates methods enabling live tiles without application-code execution and based on an identity of a user.

FIG. 5 depicts a method 500 enabling live tiles without application-code execution and based on an identity of a user.

Block 502 receives, at a computing device with which a user is not associated, an identifier associated with the user. Such a computing device may be a public network terminal, a friend's mobile phone, and so forth. The computing device may have been used by the user in the past, but has not retained all or any of the installed applications of a live-tile interface. The live-tile interface may be associated with the user or based on an association with the user. Thus, while a user may have used a same desktop computer at a library, the desktop computer may not have retained various installed applications or otherwise retained an association with the user. The user's association with the computing device is therefore being newly established or renewed, as least with respect to a live-tiles interface.

The identifier received can be of many various types, such as a name and password, simple name (if no security is desired), gesture password, retinal scan, biometric, and so forth. The techniques (alone or with assistance) may then authenticate the user, though this is not necessarily required.

Block 504 determines, based on the identifier, multiple applications associated with the user. Tile manager 104 may determine the multiple applications in various manners, such as by passing the identifier to a remote authenticator, receiving authentication of the user, passing the authentication to an entity that records application associations for users, and so forth. Thus, tile manager 104 may determine applications and/or their indicators (e.g., URLs), or block 504 may be used in combination with block 506 to retrieve content from a same source as the entity (e.g., content source 106) that provides associations based on the user identifier.

Block 506 retrieves content associated with one or more uninstalled applications of the multiple applications. These uninstalled applications have not been installed on the computing device or have been previously uninstalled. The content can be retrieved from multiple different remote content sources or, as noted above, tile manager 104 may retrieve content from a single source, such as content source 106 of FIG. 1.

Figure 6:
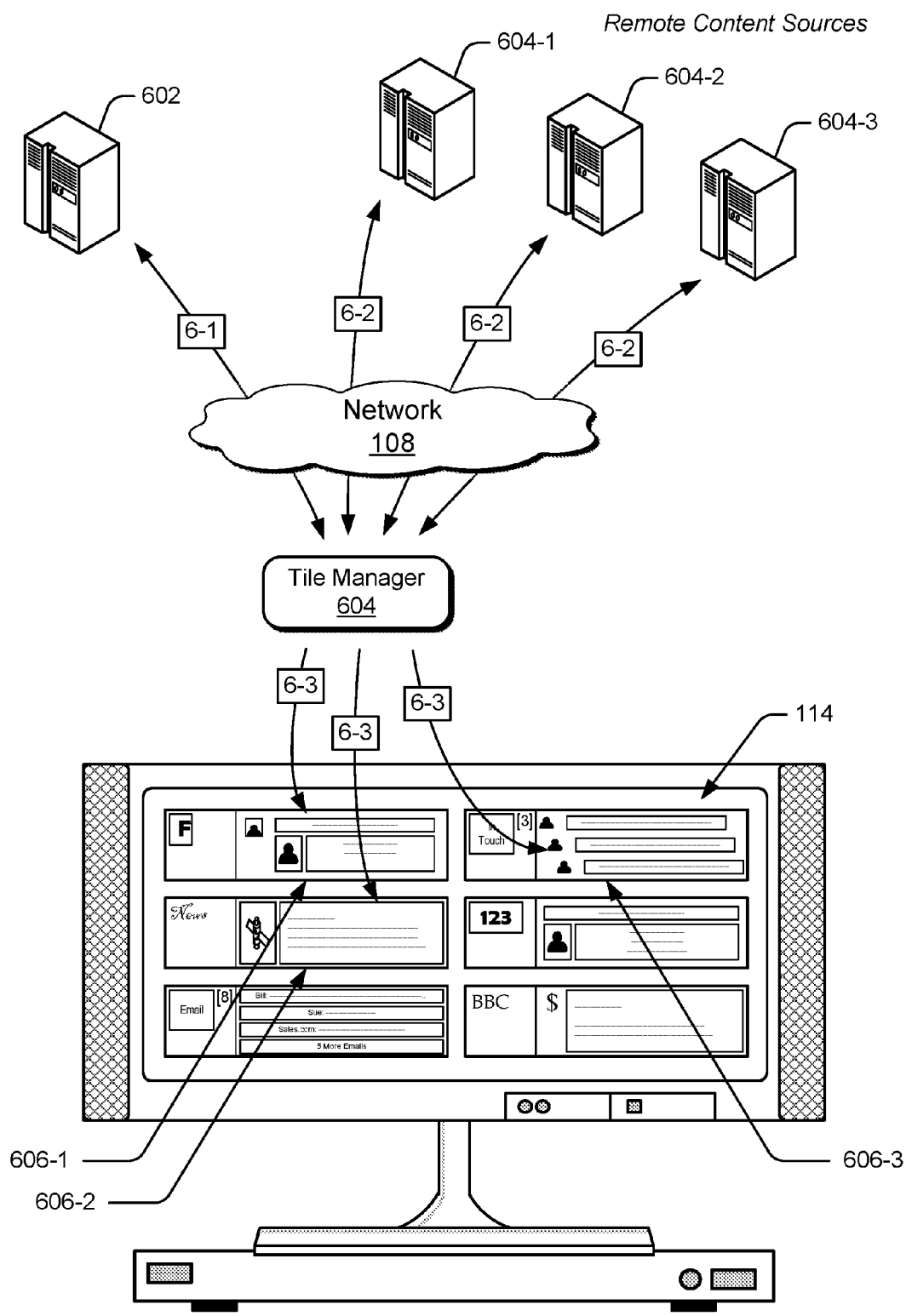
FIG. 6 illustrates an example network environment having multiple different remote content sources from which a live-tile interface can receive respective content.

FIG. 6 illustrates an example network environment having multiple different remote content sources. In the context of this particular example, tile manager 104 determines multiple applications for a user and then retrieves, for those multiple applications, content from multiple different remote content sources. As illustrated in FIG. 6, tile manager 104 communicates with remote computing device 602 (e.g., authentication server) at arrow 6-1 through network 108. Tile manager 104 identifies a user and requests application indicators associated with the user from remote computing device 602, such as URLs for each of multiple applications. With these URLs, tile manager 104 retrieves content from multiple remote content sources 604-1, 604-2, and 604-3, each of which is associated with live tiles 606-1, 606-2, and 606-3 respectively, shown at arrows 6-2.

Block 508 presents, within live tiles associated with the one or more uninstalled applications, the content retrieved. The techniques may present content in live tiles within a user interface associated with the user, such as live-tile interface 114 of FIG. 1, 4, or 6. Further, as noted in part above, tile manager 104 may present the live tiles in a particular layout associated with the user, such as layout 210 of FIG. 2, which may be determined as part of block 504. Tile manager 104 may present the content retrieved without executing application code on the computing device that is under control of one of the uninstalled applications, though the techniques are not precluded from doing so for all live-tile-enabled applications associated with the user.

Concluding the illustrated example, tile manager 104, through live-tile interface 114 of FIG. 6, presents content associated with various applications within live tiles 606-1, 606-2, and 606-3, shown at arrows 6-3. Thus, content from remote content source 604-1, which is associated with the "F" application, is presented in live tile 606-1, content from remote content source 604-2, which is associated with the "News" application, is presented in live tile 606-2, and content from remote content source 604-3, which is associated with the "In Touch" application, is presented in live tile 606-3.

Note again that each of live tiles 606 need not have an associated application running, including even a browser or other portal application. Instead, tile manager 104 is capable of retrieving content from remote sources, including doing so with low transmission bandwidth, reduced local computing resource usage, and with a fast user experience.

Figure 7:
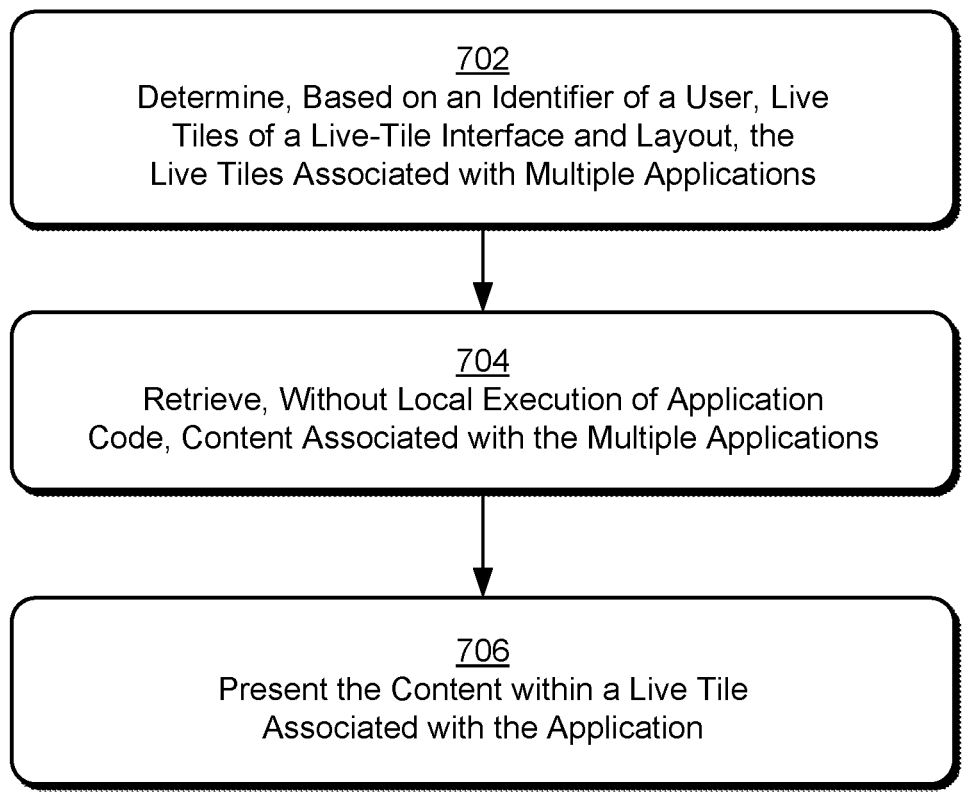
FIG. 7 illustrates methods for presenting retrieved content associated with multiple applications without local execution of application code.

FIG. 7 depicts a method 700 for presenting retrieved content associated with multiple applications without local execution of application code.

Block 702 determines, based on an identifier associated with a user, live tiles associated with multiple applications of the user. The live tiles may be presented in a live-tile user interface having a particular layout within the live-tile user interface. Tile manager 104 may do so in various manners set forth above, such as via live-tile interface 114 of FIG. 1 and according to layout 210 of FIG. 2.

Block 704 retrieves, without local execution of application code associated with the multiple applications, content associated with the multiple applications. This content may be received from local or remote sources, such as remote content sources 604-1, 604-2, or 604-3 of FIG. 6.

Block 706 presents, within the live tiles and in the layout of the live-tile user interface, the retrieved content associated with the multiple applications. As noted, tile manager 104 may arrange live tiles in any suitable layout, such as a default layout, a usage-based layout, or layout 210. Note that layout 210 is associated with the user and/or may be associated with the user's identifier. A user may select certain live tiles to be presented, and configure a layout that matches his or her preferences. Even if the techniques are performed on a computing device not associated with the user, the user's identifier can be used by tile manager 104 to determine the user's preferred live tiles and layout thereof.

The preceding discussion describes methods enabling live tiles without application-code execution. These methods are shown as sets of blocks that specify operations performed but are not necessarily limited to the order shown for performing the operations by the respective blocks.

Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

These techniques may be embodied on one or more of the entities shown in environment 100 of FIG. 1 (and as detailed in FIG. 2) and/or example device 800 described below, which may be further divided, combined, and so on. Thus, environment 100 and/or device 800 illustrate some of many possible systems or apparatuses capable of employing the described techniques. The entities of environment 100 and/or device 800 generally represent software, firmware, hardware, whole devices or networks, or a combination thereof. In the case of a software implementation, for instance, the entities (e.g., tile manager 104 and live-tile interface 114 of FIGS. 1 and 2, content sources 106 and 604 of FIGS. 1 and 6, and remote computing device 602 of FIG. 6) represent program code that performs specified tasks when executed on a processor (e.g., processors 202 and 810). The program code can be stored in one or more computer-readable memory devices, such as computer-readable storage media 204 or computer-readable media 814 of FIG. 8. The features and techniques described herein are platform-independent, meaning that they may be implemented on a variety of commercial computing platforms having a variety of processors.

Example Apparatus

Figure 8:
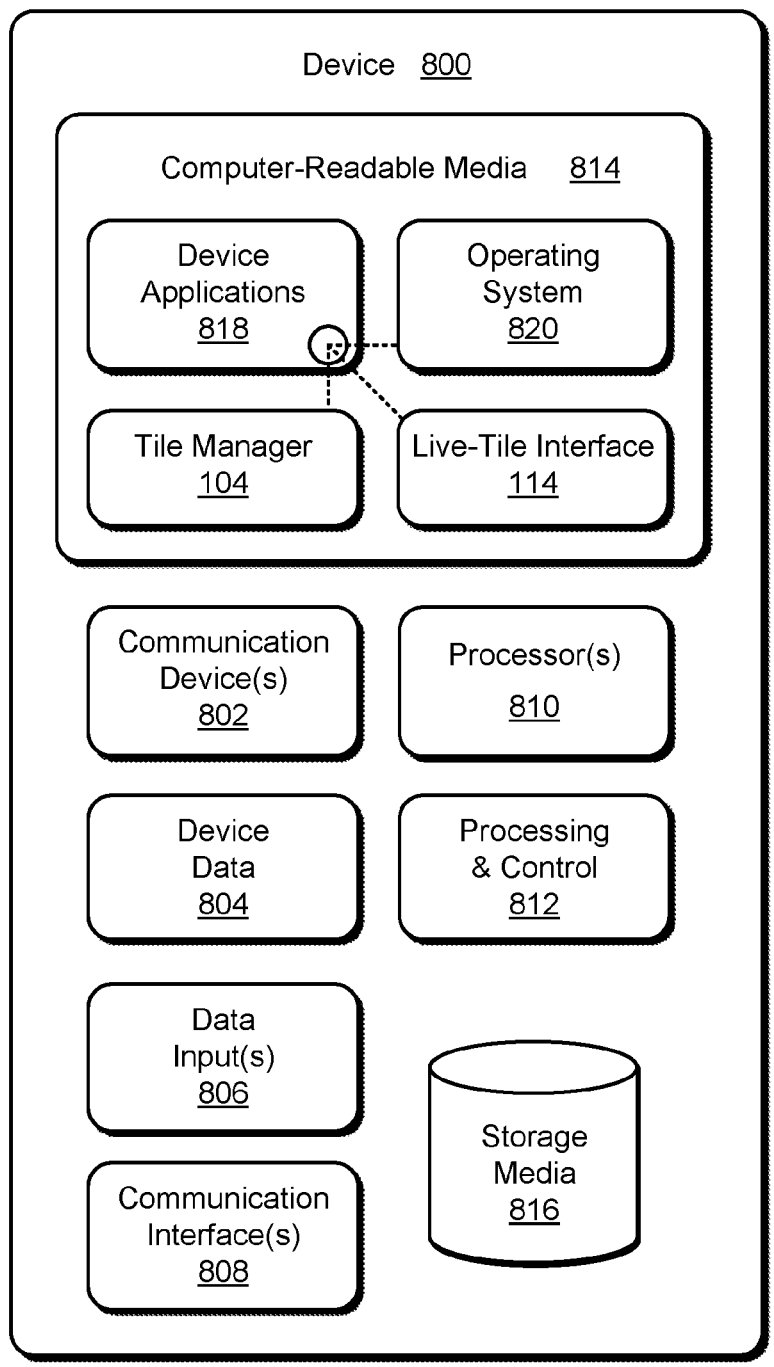
FIG. 8 illustrates an example device in which techniques for live tiles without application-code execution can be implemented.

FIG. 8 illustrates an apparatus having various components, here as part of an example device 800, which can be implemented as any type of client, server, and/or computing device as described with reference to the previous FIGS. 1-7 to implement techniques enabling live tiles without application-code execution and other techniques described herein. In some cases, device 800 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 800 may also be associated with a user (e.g., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source (e.g., images and text for presentation in live tiles).

Device 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable application reporting in an application-selectable interface. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal-processing and control module, code that is native to a particular device, a hardware abstraction layer for a particular device, and so on.

Device applications 818 also include any system components or modules to implement techniques enabling live tiles without application-code execution. In this example, device applications 818 can include tile manager 104 and live-tile interface 114.

Conclusion

Although embodiments of techniques and apparatuses enabling live tiles without application-code execution have been described in language specific to features and/or methods, it is to be understood that the subject of the appended claims is not necessarily limited to the specific features or methods described. Rather, the specific features and methods are disclosed as example implementations for live tiles without application-code execution.

What is claimed is:

1. A computer-implemented method comprising:
   receiving, at a computing device, an identifier associated with a user;
   communicating the identifier to a remote authenticator to authenticate the user, the identifier associated with multiple applications;
   if the user is authenticated by the remote authenticator, receiving content associated with at least one application of the multiple applications;
   presenting, on a display device of the computing device, a live-tile user interface containing multiple live tiles, two or more live tiles of the multiple live tiles corresponding to applications of the multiple applications associated with the identifier, each of the two or more live tiles within the live-tile user interface not occluding each other, the live-tile user interface capable of concurrently presenting content within the two or more live tiles in the live-tile user interface; and
   presenting, on the display device of the computing device, the content within a live tile associated with the at least one application, the presenting enabling, through the live-tile user interface, interaction with the content presented in the live tile.

2. The computer-implemented method as described in claim 1, wherein the content associated with the at least one application is received without executing the at least one application.

3. The computer-implemented method as described in claim 1, wherein the presenting the content within the live tile occurs without executing the at least one application.

4. The computer-implemented method as described in claim 1, further comprising, prior to presenting the content within the live tile, determining that the content is new since the user last viewed or interacted with the live-tile user interface.

5. A computer-implemented method as described in claim 1, wherein the content has previously been presented in the live tile associated with the application but has not previously been interacted with by the user through the live tile.

6. The computer-implemented method as described in claim 1, wherein the content has previously been presented in the live tile associated with the at least one application but is known to be of interest to the user.

7. The computer-implemented method as described in claim 1, wherein the content is directed to a single set of larger content.

8. The computer-implemented method as described in claim 7, wherein the content is one image or a headline for a news article.

9. The computer-implemented method as described in claim 1, wherein the content is rotated, on and off, of the live tile with other content associated with the at least one application.

10. The computer-implemented method as described in claim 1, further comprising presenting other content associated with another application, and wherein presenting the content and presenting the other content are presented at one time in the live-tile user interface, one-at-a-time in rapid succession in the live-tile user interface, or at a first frequency for the at least one application and a second frequency for the other application.

11. A system comprising:
    one or more display devices;
    one or more processors;
    one or more computer-readable storage media having computer-readable instructions thereon that, responsive to execution by the one or more processors, perform operations comprising:
    receiving, at a computing device, an identifier associated with a user;
    communicating the identifier to an authenticator to authenticate the user, the identifier associated with multiple applications;
    if the user is authenticated by the authenticator, receiving content associated with at least one application of the multiple applications;
    presenting, on at least one of the one or more display devices, a live-tile user interface containing multiple live tiles, two or more live tiles of the multiple live tiles corresponding to applications of the multiple applications associated with the identifier, each of the two or more live tiles within the live-tile user interface not occluding each other, the live-tile user interface capable of concurrently presenting content within the two or more live tiles in the live-tile user interface; and presenting, on at least one of the one or more display devices, the content within a live tile associated with the at least one application.

12. The system as described in claim 11, wherein the presenting the content within the live tile enables, through the live-tile user interface, interaction with the content presented in the live tile.

13. The system as described in claim 11, wherein the content associated with the at least one application is received without executing the at least one application.

14. The system as described in claim 11, wherein the presenting the content within the live tile occurs without executing the at least one application.

15. The system as described in claim 11, further comprising receiving metadata of the at least one application, the metadata having an indicator, and wherein receiving the content associated with the at least one application further comprises retrieving the content using the indicator.

16. The system as described in claim 11, wherein the operations further comprise presenting other content associated with another application, and wherein presenting the content and presenting the other content are presented at one time in the live-tile user interface, one-at-a-time in rapid succession in the live-tile user interface, or at a first frequency for the at least one application and a second frequency for the other application.

17. The system as described in claim 11, wherein the content is rotated, on and off, of the live tile with other content associated with the application.

18. The system as described in claim 11, wherein the content is directed to a single set of larger content of which the content is a part, at least a portion of the larger content being different than the content, and further comprising presenting the portion of the larger content within the live tile associated with the at least one application.

19. The system of claim 11, wherein one or more of the multiple applications associated with the identifier are not accessible by the system.

20. The system of claim 11, wherein one or more of the multiple applications associated with the identifier are not installed on the system.

* * * * *